US008780896B2

(12) United States Patent
Mehra

(10) Patent No.: US 8,780,896 B2
(45) Date of Patent: Jul. 15, 2014

(54) METHODS AND APPARATUS FOR VALIDATION OF EQUAL COST MULTI PATH (ECMP) PATHS IN A SWITCH FABRIC SYSTEM

(75) Inventor: Ashwani Kumar Mehra, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 146 days.

(21) Appl. No.: 12/981,025

(22) Filed: Dec. 29, 2010

(65) Prior Publication Data
US 2012/0170575 A1    Jul. 5, 2012

(51) Int. Cl.
*H04L 12/50*    (2006.01)
(52) U.S. Cl.
USPC ........... 370/359; 370/229; 370/230; 370/384; 370/400; 370/401
(58) Field of Classification Search
USPC ......... 370/229, 230, 235, 359, 367, 384, 388, 370/400, 401
See application file for complete search history.

(56) References Cited

U.S. PATENT DOCUMENTS

| | | | | |
|---|---|---|---|---|
| 5,166,926 A | * | 11/1992 | Cisneros et al. | 370/392 |
| 5,271,000 A | * | 12/1993 | Engbersen et al. | 370/244 |
| 5,390,173 A | * | 2/1995 | Spinney et al. | 370/401 |
| 5,408,231 A | | 4/1995 | Bowdon | |
| 5,414,704 A | * | 5/1995 | Spinney | 370/389 |
| 5,600,638 A | | 2/1997 | Bertin et al. | |
| 5,689,500 A | * | 11/1997 | Chiussi et al. | 370/235 |
| 5,909,686 A | * | 6/1999 | Muller et al. | 1/1 |
| 5,982,770 A | * | 11/1999 | Sekine | 370/360 |
| 6,075,773 A | | 6/2000 | Clark et al. | |
| 6,335,930 B1 | * | 1/2002 | Lee | 370/387 |
| 6,335,992 B1 | * | 1/2002 | Bala et al. | 385/17 |
| 6,608,816 B1 | | 8/2003 | Nichols | |
| 6,647,017 B1 | * | 11/2003 | Heiman | 370/412 |
| 6,654,923 B1 | | 11/2003 | Grenier et al. | |

(Continued)

FOREIGN PATENT DOCUMENTS

EP    1 320 219 A2    6/2003

OTHER PUBLICATIONS

Spirent Communications, "Packet Generator and Analyzer Base Package" P/N 79-000028 Rev.E May 2007, © 2007 Spirent Communications, Inc., 8 pages.

(Continued)

*Primary Examiner* — Andrew Lai
*Assistant Examiner* — Andrew C Lee
(74) *Attorney, Agent, or Firm* — Cooley LLP

(57) ABSTRACT

An apparatus includes a replication engine of a switch module of a multi-stage switch. The replication engine is configured to receive a first validation packet from an input port of the switch module. The replication engine is configured to determine multiple output ports of the switch module to which a data packet can be sent to reach a destination device associated with the first validation packet. The replication engine is configured to define multiple second validation packets based on a number of output ports from the multiple output ports such that each second validation packet from the multiple second validation packets is uniquely associated with an output port from the multiple output ports. The replication engine is configured to send the multiple second validation packets to an output module configured to forward each second validation packet from the multiple second validation packets to its associated output port.

20 Claims, 7 Drawing Sheets

(56) References Cited

U.S. PATENT DOCUMENTS

| | | |
|---|---|---|
| 6,665,495 B1 | 12/2003 | Miles et al. |
| 6,721,269 B2 | 4/2004 | Cao et al. |
| 6,795,402 B1 | 9/2004 | Richardson et al. |
| 6,829,237 B2* | 12/2004 | Carson et al. ............ 370/386 |
| 6,940,851 B2* | 9/2005 | Oki et al. ................ 370/388 |
| 6,990,063 B1* | 1/2006 | Lenoski et al. ........... 370/218 |
| 7,016,305 B1 | 3/2006 | Michelson et al. |
| 7,042,842 B2* | 5/2006 | Paul et al. ............... 370/229 |
| 7,046,681 B2* | 5/2006 | Siu et al. ................ 370/400 |
| 7,100,091 B2 | 8/2006 | Nakamoto et al. |
| 7,142,509 B1* | 11/2006 | Rovner et al. ............ 370/230 |
| 7,167,481 B2* | 1/2007 | Steele et al. ............. 370/413 |
| 7,184,408 B2 | 2/2007 | Denton et al. |
| 7,222,255 B1 | 5/2007 | Claessens et al. |
| 7,315,963 B2 | 1/2008 | Luciani et al. |
| 7,356,077 B2 | 4/2008 | Fala et al. |
| 7,391,736 B2 | 6/2008 | Na et al. |
| 7,489,641 B2 | 2/2009 | Miller et al. |
| 7,643,424 B2 | 1/2010 | Liu et al. |
| 7,664,110 B1* | 2/2010 | Lovett et al. ............. 370/392 |
| 7,706,302 B2* | 4/2010 | Page ..................... 370/254 |
| 7,826,381 B1 | 11/2010 | Kastuar et al. |
| 7,852,843 B2* | 12/2010 | Liu et al. ................ 370/392 |
| 7,936,783 B1 | 5/2011 | Bharali et al. |
| 7,966,420 B2 | 6/2011 | Mehta et al. |
| 7,969,880 B2* | 6/2011 | Yano et al. ............. 370/230.1 |
| 8,014,317 B1 | 9/2011 | Ghosh et al. |
| 8,149,730 B1 | 4/2012 | Aybay et al. |
| 8,174,991 B1 | 5/2012 | Trivedi |
| 8,284,677 B2 | 10/2012 | Kini et al. |
| 2001/0021189 A1 | 9/2001 | Shiota |
| 2002/0016708 A1 | 2/2002 | Houh |
| 2002/0059545 A1 | 5/2002 | Nakashima et al. |
| 2002/0064170 A1 | 5/2002 | Siu et al. |
| 2002/0116675 A1 | 8/2002 | Gangl et al. |
| 2003/0035432 A1 | 2/2003 | Sreejith et al. |
| 2003/0058880 A1 | 3/2003 | Sarkinen et al. |
| 2003/0074468 A1* | 4/2003 | Chang et al. ............. 709/238 |
| 2003/0156548 A1 | 8/2003 | Sapp |
| 2003/0223376 A1 | 12/2003 | Elliott et al. |
| 2004/0024903 A1* | 2/2004 | Costatino et al. .......... 709/238 |
| 2004/0184453 A1* | 9/2004 | Moriwaki ................ 370/389 |
| 2005/0002334 A1* | 1/2005 | Chao et al. .............. 370/230 |
| 2005/0068968 A1 | 3/2005 | Ovadia et al. |
| 2006/0165098 A1* | 7/2006 | Varma .................... 370/397 |
| 2006/0165111 A1* | 7/2006 | Varma .................... 370/428 |
| 2006/0165112 A1* | 7/2006 | Varma .................... 370/428 |
| 2006/0262728 A1 | 11/2006 | Addeo et al. |
| 2007/0263535 A1 | 11/2007 | Shabtay |
| 2008/0052015 A1 | 2/2008 | Ozawa et al. |
| 2008/0123528 A1* | 5/2008 | Wyatt ................... 370/232 |
| 2008/0285449 A1 | 11/2008 | Larsson et al. |
| 2008/0285466 A1 | 11/2008 | Salam et al. |
| 2009/0003212 A1 | 1/2009 | Kwan et al. |
| 2010/0061378 A1 | 3/2010 | Joyner et al. |
| 2010/0135289 A1* | 6/2010 | Bowes ................... 370/389 |
| 2010/0165983 A1 | 7/2010 | Aybay et al. |
| 2010/0165984 A1 | 7/2010 | Aybay |
| 2010/0202045 A1* | 8/2010 | Park et al. ............... 370/394 |
| 2010/0228842 A1 | 9/2010 | Kompella et al. |
| 2011/0096664 A1* | 4/2011 | Petry et al. .............. 370/231 |
| 2011/0194404 A1 | 8/2011 | Kluger et al. |
| 2011/0222413 A1 | 9/2011 | Shukla et al. |
| 2012/0069742 A1 | 3/2012 | Kaufmann et al. |
| 2012/0147893 A1 | 6/2012 | Shabtay et al. |
| 2012/0170585 A1 | 7/2012 | Mehra et al. |
| 2012/0189009 A1 | 7/2012 | Shekhar et al. |
| 2012/0281575 A1* | 11/2012 | Iwata et al. .............. 370/252 |

OTHER PUBLICATIONS

Spirent Communications, Abacus™ 50 T1 and E1, "T1 and E1 Traffic Generator Test System" P/N 79-000122 Rev.E Nov. 2007, © 2007 Spirent Communications, Inc., 4 pages.

S. Amante et al. "Operations and Maintenance Next Generation Requirements" © The IETF Trust, (Feb. 18, 2008), 22 pages.

P. Pan et al. "Fast Reroute Extensions to RSVP-TE for LSP Tunnels," Standards Track, © The Internet Society (May 2005), 38 pages.

Working Group Group Name: A Viswanathan et al., Forcel10 Networks "TraceFlow; draft-zinjuvadia-traceflow-02.txt", Internet Engineering Task Force, IETF; Standard Working Draft, Internet Society (ISOC) 4, Rue Des Falaises Ch—1205 Geneva, Switzerland, No. 2, Aug. 16, 2008, 38 pages.

Non-Final Office Action mailed Nov. 21, 2012 for U.S. Appl. No. 12/981,033.

Final Office Action mailed Aug. 2, 2013 for U.S. Appl. No. 12/981,033.

* cited by examiner

METHODS AND APPARATUS FOR VALIDATION OF EQUAL COST MULTI PATH (ECMP) PATHS IN A SWITCH FABRIC SYSTEM

CROSS-REFERENCE TO RELATED APPLICATION

This application is related to U.S. patent application No. 12/981,033, entitled "Methods and Apparatus for Standard Protocol Validation Mechanisms Deployed Over a Switch Fabric System," filed on Dec. 29, 2010, published as US Patent Application Publication No. 2012/0170585, the disclosure of which is hereby incorporated herein by reference in its entirety.

BACKGROUND

Some embodiments described herein relate generally to switch fabric systems, and, in particular, to methods and apparatus for operations, administration and management/maintenance validation within a switch fabric system.

Some known switch fabric systems include an Equal Cost Multi Path (ECMP) mechanism that provides outgoing ECMP paths from, for example, a network or an Ethernet Packet Switching Fabric switching element, as members of a single multi-chassis link aggregation group (LAG) that originate on that switching element and which individual members terminate on different downstream switching elements. In such a known switch fabric system, the traffic (e.g., data packets) can get distributed across these ECMP paths based on a LAG load distribution mechanism in the hardware of the switch fabric system. The ECMP mechanism typically includes a hashing function that operates on a set of Packet Header fields, and optionally, other values programmed or computed in the hardware datapath. In a network or switch fabric using such an ECMP mechanism, any given flow, which may also be an operations, administration and management/maintenance (OAM) mechanism (e.g., validation process), can be load-balanced to one set of ECMP paths. In such a network or switch fabric, the OAM mechanism may fail to detect forwarding failures (if any) on other paths in the network or switch fabric. Thus, such an OAM mechanism aimed at validating such a network or switch fabric may be incapable of validating all possible paths possible within the network or switch fabric.

Some known switch fabric systems include enabling next-generation OAM protocol data units (PDUs) to carry operator-specified tuples, which are fed to the LAG-based hashing mechanism. This approach implies availability of specific interfaces from the hardware that can use the given tuples as inputs for hashing. Such an approach can be impractical from a usability point of view.

Accordingly, a need exists for an OAM mechanism that can be used to validate all possible ECMP paths within a switch fabric system without having to generate OAM PDUs to probabilistically hit each of the multipaths possible within the switch fabric system.

SUMMARY

An apparatus includes a replication engine of a switch module of a multi-stage switch. The replication engine is configured to receive a first validation packet from an input port of the switch module. The replication engine is configured to determine multiple output ports of the switch module to which a data packet can be sent to reach a destination device associated with the first validation packet. The replication engine is configured to define multiple second validation packets based on a number of output ports from the multiple output ports such that each second validation packet from the multiple second validation packets is uniquely associated with an output port from the multiple output ports. The replication engine is configured to send the multiple second validation packets to an output module configured to forward each second validation packet from the multiple second validation packets to its associated output port.

DETAILED DESCRIPTION

Figure 1:
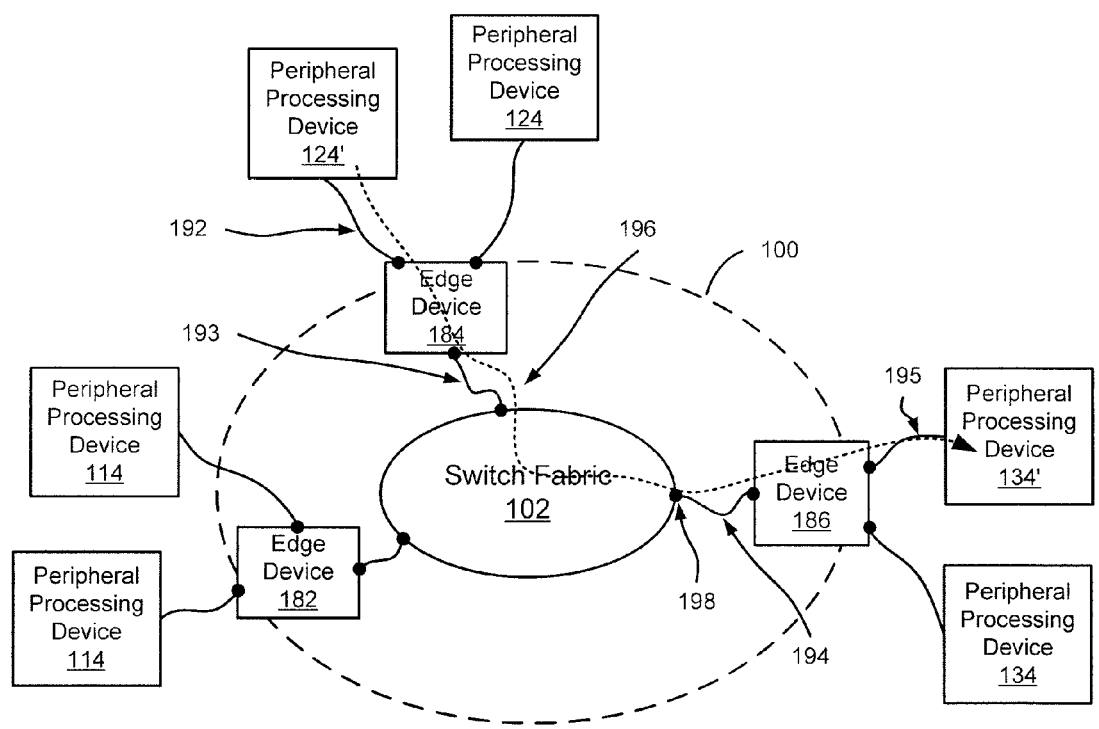
FIG. 1 is a system block diagram of a switch fabric system, according to an embodiment.

Methods and apparatus are described herein to provide an Operations, Administration and Management/Maintenance (OAM) mechanism (also referred to herein as "validation mechanism" or "validation process") within a switch fabric system to validate all possible paths within the switch fabric system through which a data packet can be transmitted from a source edge device to a destination edge device. For example, each possible path through each link(s) between each stage of a multi-stage switch fabric system can be validated. Methods and systems described herein can be used, for example, within Ethernet link aggregation group (LAG) Equal Cost Multi Path (ECMP)-based Packet-Switched Fabrics or networks. In such a network or switch fabric, a LAG can be used as an ECMP mechanism in the Ethernet switch fabric or network, with outgoing LAG members from a single switching element terminating on multiple downstream switching elements. In such a network or switch fabric, data packets can be distributed across these ECMP paths based on a LAG load distribution mechanism in the hardware of the switch fabric system.

In some embodiments, a switch fabric system can include a switching element with a set of outgoing interfaces participating in a hashing-based ECMP mechanism via a LAG membership. In some embodiments, an edge device or stage of the switch fabric system can include multiple LAGs. A lookup table can be defined a-priori on the local central processing unit (CPU) of the switching element. The lookup table can include a set of reserved tuples, and each tuple in this lookup table can include a unique set of parameters associated with possible output ports through which a data packet can be sent. This unique set of parameters can be the same as the parameters used by the hashing mechanism as its input, which result in an output from the hashing mechanism of the associated possible output ports. The maximum number of tuple entries in the lookup table can be the same as the maximum number of ECMP paths supported by the hardware, or in other words, the maximum number of possible members in the LAG. Typical parameters used for LAG hashing can include, for example, Src MAC, Dst MAC, Input Port, etc. For parameters that are addresses (e.g., Src MAC/DstMAC), the populated values in the lookup table entries can be obtained come from a pre-reserved pool of addresses; in alternative embodiments, the populated values in the lookup table entries are not obtained from a pre-reserved pool of addresses.

In some embodiments, the tuple values (described above) can be pre-computed such that a given tuple, when given as input to the hashing algorithm, results in a unique hash index result. Some or all parameters of the N tuples from the lookup table can be used to define corresponding header values for M frames (where M is the membership count of the LAG and $0<M\leq N$), and also to set other datapath hardware values, which can be used as an input by the hashing algorithm. The frames are marked as OAM protocol data units (PDUs) via the use of a reserved type value (e.g., new Ethertype/SNAP (Sub Network Access Protocol) encapsulation). The PDUs can also have additional header fields and payload definitions for carrying OAM-related information. The PDUs can be inserted into the datapath and undergo hashing for load-balancing. The PDUs can be mapped to different outgoing links. As such, the OAM PDUs are sent across the outgoing LAG member interfaces, with one OAM PDU being transmitted on each LAG member. This allows semi-deterministic transmission of OAM PDUs on LAG multipath.

As described herein, a module (e.g., a first-stage module, a second stage module, etc.) of a switch fabric can include a replication engine that can append a header to the header portion of an incoming data packet, including an OAM data packet (e.g., also referred to herein as a "validation packet" or a "validation data packet"). The header portion of the incoming data packet can include, for example, an Ethernet header; the appended header can be a meta-header appended by the module. In some embodiments, the appended header can replace, rather than encapsulate, a header(s) on the incoming validation packet. The appended header can include a header value that is associated with a particular output port of the module. For example, the header value can be defined from a reverse hash lookup table that includes one or more associations between a hash function input value and an identifier of an output port coupled to the module. The module can also include a hash engine that can use the assigned header value as input to a hash function to determine through which output port (e.g., from multiple output ports) that the data packet can be sent to reach a destination edge device. Because the header value was assigned based on the reverse hash lookup table, the output of the hash function is predefined to be the identifier of the output port associated with that header value in the reverse hash lookup table. Thus, the switch fabric system provides an OAM mechanism to direct data packets to one or more predetermined paths of the switch fabric system. Such an OAM mechanism can be used, for example, to send a validation packet through all possible paths that a data packet can flow between a source edge device and a destination edge device of a switch fabric system.

In some embodiments, the replication engine of a switch module of a multi-stage switch is configured to receive a first validation packet from an input port of the switch module. The replication engine is configured to determine multiple output ports of the switch module to which a data packet can be sent to reach a destination device associated with the first validation packet. The replication engine is configured to define multiple second validation packets based on a number of output ports from the multiple output ports such that each second validation packet from the multiple second validation packets is uniquely associated with an output port from the multiple output ports. The replication engine is configured to send the multiple second validation packets to an output module configured to forward each second validation packet from the multiple second validation packets to its associated output port.

In some embodiments, the replication engine can be, for example, a logical functional block that includes functionality from both datapath and the local central processing unit (CPU) of an edge device and/or a module of a switch fabric system. The logical functional block can be responsible for trapping a first validation packet, tracking LAG membership, generating the appropriate number of second validation packets with relevant headers based on a header look-up table, and transmitting the second validation packets on the datapath. A replication engine can define a direct or indirect association between a validation packet and a datapath. For example, in some embodiments, a replication engine can append a header value to a validation packet and the header value can have a direct association to a particular output port. The header value can be obtained by the replication engine from a reverse hash look-up table. The reverse hash lookup table can refer to a mechanism, which generates a hash tuple (i.e., a set of fields across one or more nested-headers, used for the hashing function), given a hash index. In some embodiments, the appended header value can alternatively have an indirect association to the output ports. For example, the header value can be associated to a unique hash index value that may be an index defined by a separate table of LAG members. In such an embodiment, the header values can be indirectly associated with a LAG member output port.

In some embodiments, a non-transitory processor-readable medium storing code representing instructions to cause a processor to receive a first validation packet at a switch module of a distributed switch. A number of output ports from multiple output ports of the switch module to which a data packet can be sent to reach a destination edge device associated with the first validation packet are determined. A set of second validation packets is defined based on the number of output ports from the multiple output ports. Each second validation packet from the set of second validation packets is uniquely associated with an output port from the multiple output ports of the switch module to which the first validation packet can be sent. Each second validation packet from the set of second validation packets is sent to its associated output port.

In some embodiments, an apparatus includes a hash engine of a switch module of a multi-stage switch. The hash engine is configured to receive multiple validation packets defined based on the switch module receiving a single validation packet at an input port. The hash engine is configured to forward each validation packet from the multiple validation packets to a different output port from multiple output ports based on an output of a hash function. A header portion of each validation packet from the multiple validation packets can be an input to the hash function. The header portion of the incoming data packet can include, for example, an Ethernet header; the appended header can be a meta-header appended by the module. In some embodiments, the appended header can replace, rather than encapsulate, a header(s) on the incoming validation packet. The header portion of each validation packet from the multiple validation packets being defined from a reverse hash table lookup having an association between (1) a hash function input that results in a hash function output of an identifier of an output port from the multiple output ports and (2) the identifier of that output port from the multiple output ports.

Embodiments shown and described herein refer to multiple communication layers (e.g., data link layer (layer-2), network layer (layer-3), physical layer (layer-1), application layer (layer-7), etc.). Such communication layers can be defined by the open systems interconnection (OSI) model. Accordingly, the physical layer can be a lower level layer than the data link layer. Additionally, the data link layer can be a lower level layer than the network layer and the application layer. Further, different protocols can be associated with and/or implemented at different layers within the OSI model. For example, an Ethernet protocol, a Fibre Channel protocol and/or a cell based protocol (e.g., used within a data plane portion of a communications network) can be associated with and/or implemented at a data link layer, and a Border Gateway Protocol (BGP) can be associated with and/or implemented at a higher layer, such as, for example, an application layer. Although BGP can be implemented at the application layer, it can be used to send forwarding-state information (e.g., port identifiers, network segment identifiers, peripheral processing device identifiers, etc.) used to populate a routing table associated with a network layer and/or data link layer.

As used herein, the term "physical hop" can include a physical link between two modules and/or devices. For example, a data path operatively coupling a first module with a second module can be said to be a physical hop. Similarly stated, a physical hop can physically link the first module with the second module.

As used herein, the term "single physical hop" can include a direct physical connection between two modules in a system. Similarly stated, a single physical hop can include a link via which two modules are coupled without intermediate modules. Accordingly, for example, if a first module is coupled to a second module via a single physical hop, the first module can send data packets directly to the second module without sending the data packets through intervening modules.

As used herein, the term "single logical hop" means a physical hop and/or group of physical hops that are a single hop within a network topology associated with a first protocol. Similarly stated, according to the topology associated with the first protocol, no intervening nodes exist between a first module and/or device operatively coupled to a second module and/or device via the physical hop and/or the group of physical hops. A first module and/or device connected to a second module and/or device via a single logical hop can send a data packet to the second module and/or device using a destination address associated with the first protocol and the second module and/or device, regardless of the number of physical hops between the first device and the second device. In some embodiments, for example, a second protocol can use the destination address of the first protocol to route a data packet and/or cell from the first module and/or device to the second module and/or device over the single logical hop. Similarly stated, when a first module and/or device sends data to a second module and/or device via a single logical hop of a first protocol, the first module and/or device treats the single logical hop as if it is sending the data directly to the second module and/or device.

In some embodiments, a switch fabric can function as part of a single logical hop (e.g., a single large-scale consolidated L2/L3 switch). Portions of the switch fabric can be physically distributed across, for example, many chassis and/or modules interconnected by multiple physical hops. In some embodiments, for example, a processing stage of the switch fabric can be included in a first chassis and another processing stage of the switch fabric can be included in a second chassis. Both of the processing stages can logically function as part of a single consolidated switch (e.g., within the same logical hop according to a first protocol) but include a separate single physical hop between respective pairs of processing stages. Similarly stated, a physical hop can operatively couple each stage within a switch fabric representing a single logical hop associated with a protocol used to route data outside the switch fabric. Additionally, packet classification and forwarding associated with a protocol used to route data outside a single logical hop need not occur at each stage within the single logical hop. In some embodiments, for example, packet classification and forwarding associated with a first protocol (e.g., Ethernet) can occur prior to a module and/or device sending the data packet to another module and/or device via the single logical hop.

As used herein, a module that is within a switch fabric can be, for example, any assembly and/or set of operatively-coupled electrical components that define one or more switches within a stage of a switch fabric. In some embodiments, a module can include, for example, a memory, a processor, electrical traces, optical connectors, software (executing in hardware) and/or the like.

As used herein, "associated with" can mean, for example, included in, physically located with, a part of, and/or operates or functions as a part of. For example, a module associated with a first stage of a switch fabric can be said to be included in, physically located with or a part of the first stage of the switch fabric. A module associated with a first stage of a switch fabric can also be said to operate or function as a part of the first stage of the switch fabric. Additionally, "associated with" can mean, for example, references, identifies, characterizes, describes, and/or sent from. For example, an identifier associated with a virtual channel can be an identifier that identifies, references and/or relates to the virtual channel.

As used in this specification, the singular forms "a," "an" and "the" include plural referents unless the context clearly dictates otherwise. Thus, for example, the term "a switch fabric" is intended to mean a single switch fabric or a combination of switch fabrics.

The terms "first stage", "second stage" and so on refer to portions, modules or nodes within a switch fabric. In some instances, these terms refer to a specific stage within a given switch fabric. For example, a three-stage Clos network includes three consecutive stages from ingress to egress; such a switch fabric has three stages that can be referred to as the "first stage" (the first stage with respect to the ingress to egress direction) through the third stage (the third and final stage with respect to the ingress to egress direction). For example, FIG. 2 refers to specific stages within a given switch fabric. In other instances, however, the terms "first stage", "second stage" and so on refer to any stage within the switch fabric and correspond to the order of discussion of a given stage. For example, the "first stage" can refer to the first stage discussed and can correspond to any stage within the switch fabric (e.g., the third stage within a three-stage Clos network), and the "second stage" can refer to a remaining stage within the switch fabric (e.g., the second stage within the three-stage Clos network). Thus, it should be understood that the specific context will indicate whether the terms "first stage", "second stage" and so on can refer to a specific ordinal stage within a switch fabric or can refer to any particular stage within the switch fabric.

FIG. 1 is a schematic diagram that illustrates a switch fabric system 100, according to an embodiment. The switch fabric system 100 includes a switch fabric 102 and multiple edge devices 182, 184, 186. The switch fabric system 100 operatively couples multiple peripheral processing devices 114, 124, 134 to each other. The peripheral processing devices 114, 124, 134 can be, for example, compute nodes, service nodes, routers, and storage nodes, as described in further detail herein. In some embodiments, for example, the peripheral processing devices 114, 124, 134 include servers, storage devices, gateways, workstations, and/or the like.

The peripheral processing devices 114, 124, 134 can be operatively coupled to the edge devices 182, 184, 186 of the switch fabric system 100 using any suitable connection such as, for example, an optical connection (e.g., an optical cable and optical connectors), an electrical connection (e.g., an electrical cable and electrical connectors) and/or the like. As such, the peripheral processing devices 114, 124, 134 are configured to send data (e.g., data packets, data cells, etc.) to the switch fabric system 100 via the edge devices 182, 184, 186. In some embodiments, the connection between the peripheral processing devices 114, 124, 134 and the edge devices 182, 184, 186, respectively, is a direct link. Such a link can be said to be a single physical hop link. In other embodiments, the peripheral processing devices can be operatively coupled to the edge devices via intermediate modules. Such a connection can be said to be a multiple physical hop link.

Each edge device 182, 184, 186 can be any device configured to operatively couple peripheral processing devices 114, 124, 134 to the switch fabric 102. In some embodiments, for example, the edge devices 182, 184, 186 can be access switches, input/output modules, top-of-rack devices and/or the like. Structurally, the edge devices 182, 184, 186 can function as both source edge devices and destination edge devices. Accordingly, the edge devices 182, 184, 186 can send data (e.g., a data stream of data packets and/or data cells) to and receive data from the switch fabric 102, and to and from the connected peripheral processing devices 114, 124, 134.

In some embodiments, the edge devices 182, 184, 186 can be a combination of hardware modules and software modules (executing in hardware). In some embodiments, for example, each edge device 182, 184, 186 can include a field-programmable gate array (FPGA), an application specific integrated circuit (ASIC), a digital signal processor (DSP) and/or the like.

The edge devices 182, 184, 186 can be configured to prepare a data packet (e.g., an Ethernet packet) to enter the switch fabric 102. For example, the edge devices 182, 184, 186 can be configured to forward, classify, and/or modify the packet encapsulation (e.g., modify, add and/or remove a header portion, footer portion and/or any other identifier included within the data packet) of a data packet prior to sending the data packet to the switch fabric 102. Additional details related to packet classification are described in U.S. patent application Ser. No. 12/242,168 entitled "Methods and Apparatus Related to Packet Classification Associated with a Multi-Stage Switch," filed Sep. 30, 2008, and U.S. patent application Ser. No. 12/242,172, entitled "Methods and Apparatus for Packet Classification Based on Policy Vectors," filed Sep. 30, 2008, both of which are incorporated herein by reference in their entireties.

Each of the edge devices 182, 184, 186 is configured to communicate with the other edge devices 182, 184, 186 via the switch fabric 102. Specifically, the switch fabric 102 is configured to provide any-to-any connectivity between the edge devices 182, 184, 186 at relatively low latency. For example, switch fabric 102 can be configured to transmit (e.g., convey) data between edge devices 182, 184, 186. In some embodiments, the switch fabric 102 can have at least hundreds or thousands of ports (e.g., egress ports and/or ingress ports) through which edge devices 182, 184, 186 can transmit and/or receive data.

The edge devices 182, 184, 186 can include one or more network interface devices (e.g., a 40 Gigabit (Gb) Ethernet interface, a 100 Gb Ethernet interface, etc.) through which the edge devices 182, 184, 186 can send signals to and/or receive signals from the switch fabric 102. The signals can be sent to and/or received from the switch fabric 102 via an electrical link, an optical link and/or a wireless link operatively coupled to the edge devices 182, 184, 186. In some embodiments, the edge devices 182, 184, 186 can be configured to send signals to and/or receive signals from the switch fabric 102 based on one or more protocols (e.g., an Ethernet protocol, a multi-protocol label switching (MPLS) protocol, a Fibre Channel protocol, a Fibre-Channel-over Ethernet protocol, an Infiniband-related protocol, a cell-based protocol, etc.).

The switch fabric 102 can be any suitable switch fabric that operatively couples the edge devices 182, 184, 186 to the other edge devices 182, 184, 186. In some embodiments, for example, the switch fabric 102 can be a Clos network (e.g., a non-blocking Clos network, a strict sense non-blocking Clos network, a Benes network) having multiple stages of switching modules (e.g., integrated Ethernet switches). In some embodiments, for example, the switch fabric 102 can be similar to the three-stage switch fabric 200 shown in FIG. 2 and described in further detail herein. In other embodiments, the switch fabric 102 shown in FIG. 1 can include any number of stages. In such embodiments, for example, the switch fabric 102 can include five, seven or nine stages. The switch fabric 102 can be, for example, part of a core portion of a data center similar to the core portion of the data center described in co-pending U.S. patent application Ser. No. 12/495,337, filed Jun. 30, 2009, and entitled "Methods and Apparatus Related to Any-to-Any Connectivity Within a Data Center," which is incorporated herein by reference in its entirety.

In some embodiments, the switch fabric 102 can be (e.g., can function as) a single consolidated switch (e.g., a single large-scale consolidated L2/L3 switch). In other words, the switch fabric 102 can be configured to operate as a single logical entity (e.g., a single logical network element). Similarly stated, the switch fabric 102 can be part of a single logical hop between a first edge device 182, 184, 186 and a second edge device 182, 184, 186 (e.g., along with the data paths between the edge devices 182, 184, 186 and the switch fabric 102). The switch fabric 102 can be configured to connect (e.g., facilitate communication between) the peripheral processing devices 114, 124, 134. In some embodiments, the switch fabric 102 can be configured to communicate via interface devices (not shown) configured to transmit data at a rate of at least 10 Gb/s. In some embodiments, the switch fabric 102 can be configured to communicate via interface devices (e.g., fibre-channel interface devices) configured to transmit data at a rate of, for example, 2 Gb/s, 4 Gb/s, 8 Gb/s, 10 Gb/s, 40 Gb/s, 100 Gb/s and/or faster link speeds.

Although the switch fabric 102 can be logically centralized, the implementation of the switch fabric 102 can be highly distributed, for example, for reliability. For example, portions of the switch fabric 102 can be physically distributed across, for example, many chassis. In some embodiments, for example, a processing stage of the switch fabric 102 can be included in a first chassis and another processing stage of the switch fabric 102 can be included in a second chassis. Both of the processing stages can logically function as part of a single consolidated switch (e.g., within the same logical hop) but have a separate single physical hop between respective pairs of processing stages. More details related to architecture of the switch fabric 102 are described herein.

In use, a data packet (e.g., an Ethernet packet) can be sent between peripheral processing devices 114, 124, 134 via remaining portions of the switch fabric system 100. For example, a data packet can be sent from a first peripheral processing device 124' to a second peripheral processing device 134' via path 196. The first peripheral processing device 124' can send the data packet to the edge device 184 via link 192. The edge device 184 can then prepare the data packet to enter the switch fabric 102. Once prepared, the edge device 184 sends the data packet to the switch fabric 102 via link 193. The switching modules within the switch fabric 102 can route the data packets through the switch fabric 102. The data packet is sent through port 198 to the edge device 186 via link 194. The edge device 186 can then send the data packet to the second peripheral processing device 134' via link 195 using the first protocol.

Figure 2:
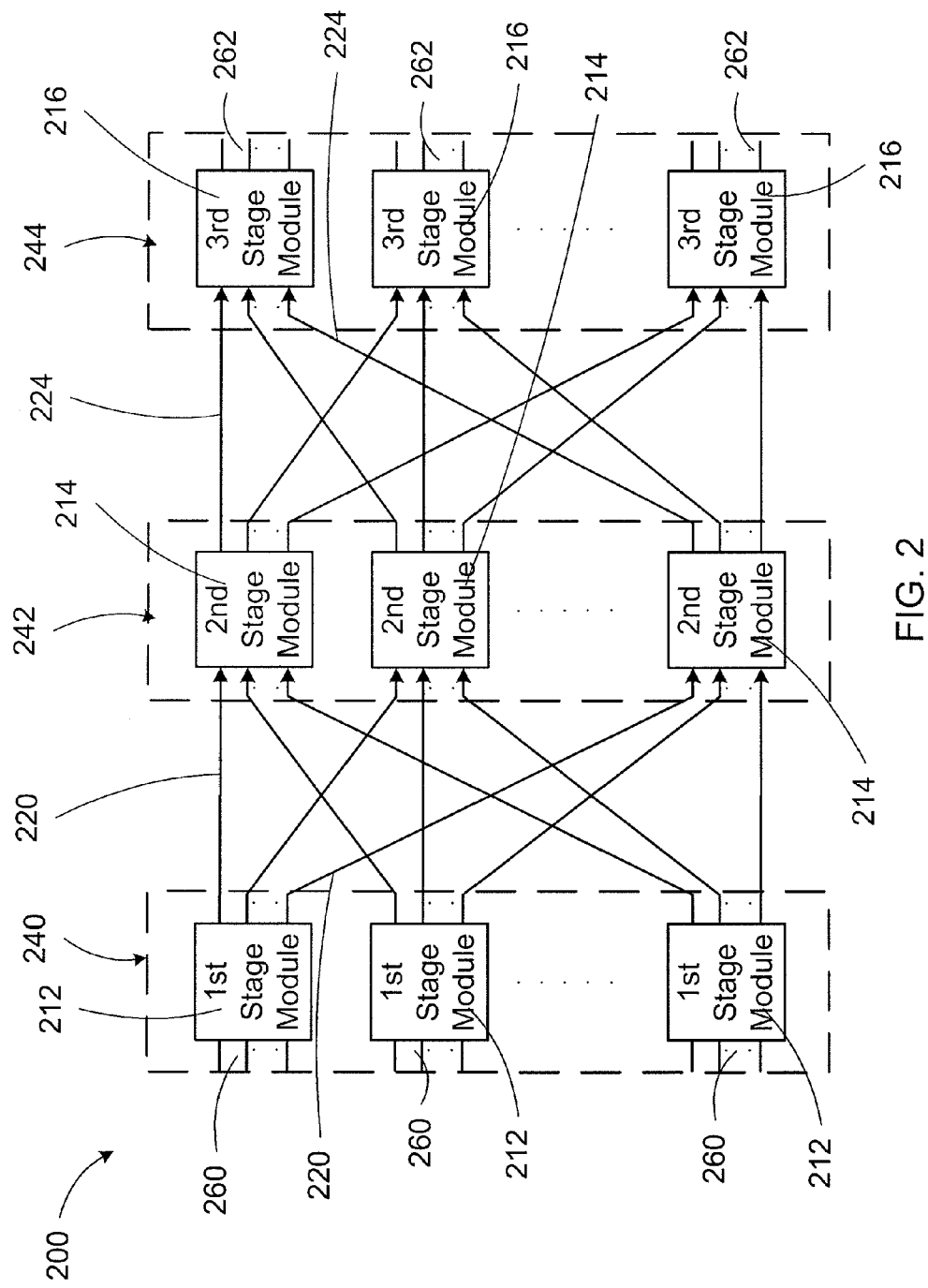
FIG. 2 is a schematic illustration of a switch fabric, according to another embodiment.

FIG. 2 is a schematic illustration of a switch fabric 200, according to an embodiment. The switch fabric 200 can include multiple physical hops that are within a single logical hop. Switch fabric 200 is a three-stage, non-blocking Clos network and includes a first stage 240, a second stage 242, and a third stage 244. The first stage 240 includes modules 212. Each module 212 of the first stage 240 is an assembly of electronic components and circuitry. In some embodiments, for example, each module is an application-specific integrated circuit (ASIC). In other embodiments, multiple modules are contained on a single ASIC or a single chip package. In still other embodiments, each module is an assembly of discrete electrical components.

In some embodiments, each module 212 of the first stage 240 is a switch (e.g., a packet switch, a frame switch, an integrated Ethernet switch and/or a cell switch). The switches are configured to redirect data (e.g., data packets, data cells, etc.) as it flows through the switch fabric 200. In some embodiments, for example, each switch includes multiple input ports operatively coupled to write interfaces on a memory buffer (not shown in FIG. 2). Similarly, a set of output ports are operatively coupled to read interfaces on the memory buffer. In some embodiments, the memory buffer can be a shared memory buffer implemented using on-chip static random access memory (SRAM) to provide sufficient bandwidth for all input ports to write one incoming cell (e.g., a portion of a data packet) or data packet per time period (e.g., one or more clock cycles) and all output ports to read one outgoing cell or data packet per time period. Each switch operates similar to a crossbar switch that can be reconfigured subsequent each time period.

Each module 212 of the first stage 240 includes a set of input ports 260 configured to receive data (e.g., a signal, a cell of a packet, a data packet, etc.) as it enters the switch fabric 200. In this embodiment, each module 212 of the first stage 240 includes the same number of input ports 260.

Similar to the first stage 240, the second stage 242 of the switch fabric 200 includes modules 214. The modules 214 of the second stage 242 are structurally similar to the modules 212 of the first stage 240. Each module 214 of the second stage 242 is operatively coupled to each module 212 of the first stage 240 by a data path 220. Each data path 220 between a given module 212 of the first stage 240 and a given module 214 of the second stage 242 is configured to facilitate data transfer from the modules 212 of the first stage 240 to the modules 214 of the second stage 242.

The data paths 220 between the modules 212 of the first stage 240 and the modules 214 of the second stage 242 can be constructed in any manner configured to facilitate data transfer from the modules 212 of the first stage 240 to the modules 214 of the second stage 242. In some embodiments, for example, the data paths 220 are optical connectors between the modules. In other embodiments, the data paths are within a midplane. Such a midplane can be similar to that described in U.S. application Ser. No. 12/345,500, filed Dec. 29, 2008, and entitled "System Architecture for a Scalable and Distributed Multi-Stage Switch Fabric," which is incorporated herein by reference in its entirety. Such a midplane can be used to connect each module of the second stage with each module of the first stage. In still other embodiments, two or more modules are contained within a single chip package and the data paths are electrical traces.

In some embodiments, the switch fabric 200 is a non-blocking Clos network. Thus, the number of modules 214 of the second stage 242 of the switch fabric 200 varies based on the number of input ports 260 of each module 212 of the first stage 240. In a rearrangeably non-blocking Clos network (e.g., a Benes network), the number of modules 214 of the second stage 242 is greater than or equal to the number of input ports 260 of each module 212 of the first stage 240. Thus, if n is the number of input ports 260 of each module 212 of the first stage 240 and m is the number of modules 214 of the second stage 242, m≥n. In some embodiments, for example, each module of the first stage has five input ports. Thus, the second stage has at least five modules. All five modules of the first stage are operatively coupled to all five modules of the second stage by data paths. Said another way, each module of the first stage can send data to any module of the second stage.

The third stage 244 of the switch fabric 200 includes modules 216. The modules 216 of the third stage 244 are structurally similar to the modules 212 of the first stage 240. The number of modules 216 of the third stage 244 is typically equivalent to the number of modules 212 of the first stage 240. Each module 216 of the third stage 244 includes output ports 262 configured to allow data to exit the switch fabric 200. Each module 216 of the third stage 244 includes the same number of output ports 262. Further, the number of output ports 262 of each module 216 of the third stage 244 is typically equivalent to the number of input ports 260 of each module 212 of the first stage 240.

Each module 216 of the third stage 244 is connected to each module 214 of the second stage 242 by a data path 224. The data paths 224 between the modules 214 of the second stage 242 and the modules 216 of the third stage 244 are configured to facilitate data transfer from the modules 214 of the second stage 242 to the modules 216 of the third stage 244.

The data paths 224 between the modules 214 of the second stage 242 and the modules 216 of the third stage 244 can be constructed in any manner configured to facilitate data transfer from the modules 214 of the second stage 242 to the modules 216 of the third stage 244. In some embodiments, for example, the data paths 224 are optical connectors between the modules. In other embodiments, the data paths are within a midplane. Such a midplane can be used to connect each module of the second stage with each module of the third stage. In still other embodiments, two or more modules are contained within a single chip package and the data paths are electrical traces.

In some embodiments, the data paths 220 between the modules 212 of the first stage 240 and the modules 214 of the second stage 242, and the data paths between the modules 214 of the second stage 242 and the modules 216 of the third stage 244, can include multiple virtual channels.

Figure 3:
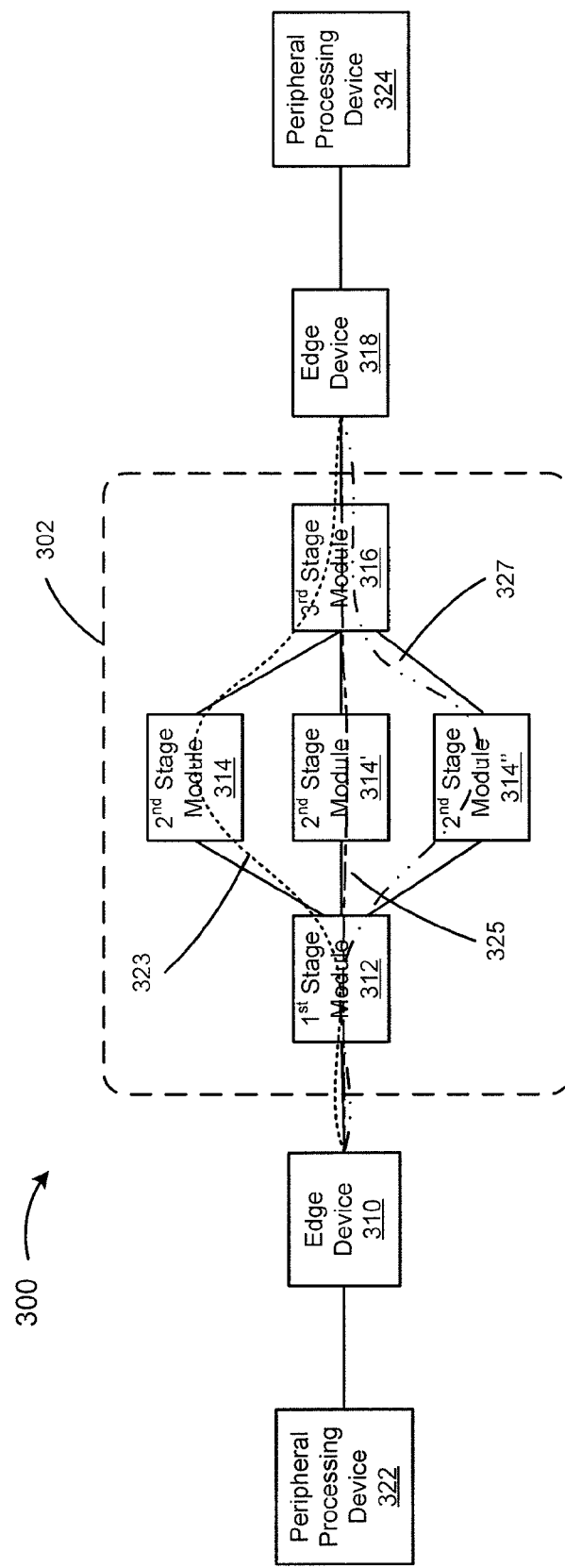
FIG. 3 is a schematic illustration of a portion of a switch fabric system, according to another embodiment.

FIG. 3 is a schematic illustration of a portion of a switch fabric system 300, according to another embodiment. The illustrated portion of the switch fabric system 300 includes a switch fabric 302, and a first edge device 310 and a second edge device 318 each operatively coupled to the switch fabric 302. The switch fabric system 300 can operatively couple a peripheral processing device 322 to a peripheral processing device 324. FIG. 3 illustrates an example of one configuration of the switch fabric system 300 showing only two edge devices 310, 318 coupled to the switch fabric 302. It should be understood, however, that the switch fabric 302 can be connected to various numbers of edge devices. It should also be understood that although only two peripheral processing devices are shown in FIG. 3, the switch fabric system 300 can operatively couple many more peripheral processing devices to each other.

The switch fabric 302 can be structurally and functionally similar to the switch fabric 200 (shown and described with respect to FIG. 2). The switch fabric 302 includes a first stage module 312, three second stage modules 314, 314' and 314", and a third stage module 316. The first stage module 312 is operatively coupled to each second stage module 314, 314', 314" via separate data paths. Similarly, each second stage module 314, 314', 314" is operatively coupled to the third stage module 316 via a separate data path. The first stage module 312 can be structurally and functionally similar to, for example, first stage modules 212 described above with reference to FIG. 2. In addition, the second stage modules 314, 314', 314" and the third stage module 316 can be structurally and functionally similar to the first stage module 312.

Although the switch fabric 302 is shown with a single first stage module 312 coupled to three second stage modules 314, 314', 314" each coupled to a single third stage module 316, it should be understood that the switch fabric 302 can include more than one first stage module, less or more than three second stage modules, and/or more than one third stage module. In some embodiments, the switch fabric 302 can be fully-interconnected similar to, for example, switch fabric 200, where each module of the first stage is coupled to each module of the second stage and each module of the second stage is coupled to each module of the third stage. In some embodiments, the switch fabric 302 may not be fully interconnected. For example, the switch fabric 302 can include a second third stage module (not shown) that is only connected to, for example, one or two of the three second stage modules 314, 314', 314".

As illustrated in FIG. 3, in this embodiment, a data packet can be transmitted from the first edge device 310 to the second edge device 318 via a first data path 323 that includes first stage module 312, second stage module 314 and third stage module 316. A data packet can also be transmitted from the first edge device 310 to the second edge device 318 via a second data path 325 that includes first stage module 312, second stage module 314' and third stage module 316, or a third data path 327 that includes first stage module 312, second stage module 314" and third stage module 316. Thus, FIG. 3 illustrates the three possible paths through the fabric switch system 300 that a data packet can be sent between first edge device 310 and second edge device 318 for this particular example. In alternative embodiments, there may be more or less possible paths out of a particular module of a particular stage.

The data paths 323, 325 and 327 include data path connections between the first stage module 312 and the second stage modules 314, 314', 314" and between the second stage modules 314, 314', 314" and the third stage module 316, each of which can be constructed in any manner configured to facilitate data transfer. In some embodiments, for example, the data paths include optical connectors, optical fibers and/or electrical connectors between the modules. In some embodiments, the data paths are within a midplane or a backplane.

The peripheral processing devices 322, 324 can be, for example, compute nodes, service nodes, routers, and storage nodes, as described in further detail herein. In some embodiments, for example, the peripheral processing devices include servers, storage devices, gateways, workstations, and/or the like. The peripheral processing devices 322, 324 can be operatively coupled to the edge devices 310 and 318, respectively, using any suitable connection such as, for example, an optical connection (e.g., an optical cable and optical connectors), an electrical connection (e.g., an electrical cable and electrical connectors) and/or the like. As such, the peripheral processing devices 322, 324 are configured to send and receive data (e.g., data packets, data cells, etc.) to and from the edge devices 310 and 318.

In use, for example, the peripheral processing device 322 can be configured to send a data packet to the peripheral processing device 324. Any peripheral processing device operatively coupled to the switch fabric 302 via an edge device (e.g., 310, 318) can be configured to send a data packet to any other peripheral processing device coupled to the switch fabric 302 via an edge device.

The edge devices 310 and 318 can be any devices configured to operatively couple peripheral processing devices (e.g., peripheral processing devices 322, 324) to the switch fabric 302. In some embodiments, for example, the edge devices 310 and 318 can be access switches, input/output modules, top-of-rack devices and/or the like. Edge device 310 is schematically shown as a source edge device and edge device 318 is schematically shown as a destination edge device for illustration purposes only. Structurally, the edge devices 310 and 318 can each function as source edge devices and destination edge devices. Accordingly, the edge devices 310 and 318 can each send data to and receive data from the switch fabric 302.

In this example embodiment, edge device 310 can be coupled to any number of modules of a first stage of a switch fabric, and edge device 318 can be coupled to any number of third stage modules of a switch fabric. Additionally, while shown in FIG. 3 as being operatively coupled to a single switch fabric 302, the edge devices 310, 318 can be operatively coupled to any number of switch fabrics, similar to switch fabric 302. In some embodiments, for example, the edge device 310 can be both coupled to the first stage module 312 associated with the first stage of the switch fabric 302 and a module (not shown in FIG. 3) associated with a first stage of a second switch fabric (not shown in FIG. 3). In such embodiments, the edge device 310 can send data to either the first stage module 312 or the module associated with the first stage of the second switch fabric.

In some embodiments, the edge devices 310, 318 can be configured to prepare a data packet to enter the switch fabric 302. For example, the edge device 310 can be configured to forward, classify, and/or modify the packet encapsulation of a data packet prior to sending the data packet to the switch fabric 302. In some embodiments, for example, the edge device 310 can append a source identifier (e.g., source MAC address, IP address, etc.), a destination identifier (e.g., source MAC address, IP address, etc.) and/or any other information to the data packet. Such information can be used to route the data packet through the switch fabric 302.

In some embodiments, a data packet (e.g., sent from peripheral processing device 322 to edge deice 310) can include a payload portion and a header portion. The payload portion can include data to be sent to a destination peripheral processing device (e.g., peripheral processing device 324).

The header portion (also referred to herein as "header") can include identifying information. In some embodiments, for example, the header can include at least a portion of an IP 5-tuple associated with the source and destination peripheral processing devices (e.g., 322 and 324, respectively). In such embodiments, for example, the header can include a destination peripheral processing device MAC address, a destination peripheral processing device internet protocol (IP) address, a source peripheral processing device MAC address, a source peripheral processing device IP address and/or a transfer protocol identifier. In the example embodiment of FIG. 3, the destination peripheral processing device MAC address and the destination peripheral processing device IP address can be associated with peripheral processing device 324, and the source peripheral processing device MAC address and the source peripheral processing device IP address can be associated with peripheral processing device 322.

In some embodiments, the edge device 310 can also append a source edge device identifier (e.g., a MAC and/or IP address associated with 310) and a destination edge device identifier (e.g., a MAC and/or IP address associated with 318). Such information can be used in conjunction with a lookup table to route the data packet through the switch fabric 302 as shown and described in U.S. patent application Ser. No. 12/607,162, filed on Nov. 18, 2009, entitled "Methods and Apparatus Related to a Distributed Switch Fabric," which is incorporated herein by reference in its entirety. Using such source and destination specific information in conjunction with a lookup table to route data packets through the switch fabric 302 can ensure that each data packet originating from a particular source (e.g., peripheral processing device 322) to be sent to a particular destination (e.g., peripheral processing device 324) will be sent through the switch fabric 302 via the same path (e.g., through the same modules associated with each stage of the switch fabric 302). Similarly stated, the order of data packets sent through the switch fabric 302 from a first edge device 310 to a second edge device 318 is maintained.

Using the information contained within the header of the data packet, the edge device 310 can determine to which first stage module to send the data packet, for example, in a switch fabric having multiple first stage modules. In some embodiments, for example, the edge device 310 can use a hash function using as inputs, a header value, such as, for example, the destination peripheral processing device MAC address, the destination peripheral processing device IP address, the source peripheral processing device MAC address, the source peripheral processing device IP address, the destination edge device identifier, the source edge device identifier and/or the transfer protocol identifier to determine to which module (e.g., which first stage module) to send the data packet.

After the first stage module 312 receives the data packet, the first stage module 312 can make a determination as to which second stage module 314, 314', 314" to send the data packet. In some embodiments, for example, the first stage module 312 can use a hash function using as an input a header value such as, for example, a destination identifier and/or a source identifier, as described above for edge device 310. Based on the input(s), the hash function can determine to which second stage module 314, 314', 314" to forward the data packet. The second stage module 314, 314', 314" can similarly use a hash function to forward the data packet to the third stage module 316. Using the destination edge device identifier, the third stage module 316 can forward the data packet to the destination edge device 318. Using the destination peripheral processing device identifier, the edge device 318 can then forward the data packet to the destination peripheral processing device 324.

During operation of the switch fabric system 300, it may be desirable to validate the switch fabric system 300 to ensure that a data packet sent from a source edge device (e.g., 310) reaches the desired destination edge device (e.g., 318) through any of possible paths (e.g., paths 323, 325, 327) that that data packet can be sent and reach the destination edge device. Because of the multiple possible paths that a data packet can be sent to reach a particular destination edge device within such an ECMP switch fabric system (e.g., 300), if a validation packet is sent through only one portion of ECMP paths (e.g., one of paths 323, 325, 327), any possible failures within the other possible paths through the switch fabric system to reach the destination edge device will not be identified. To address this issue, the switch fabric system 300 includes an OAM mechanism (e.g., validation mechanism or validation process) that includes sending a validation packet through each of the possible paths of the switch fabric system 300 through which a validation packet can be sent from a source edge device to a destination edge device. The validation process can identify any failures within those possible paths of the validation packet within the switch fabric system 300.

As described in more detail below with reference to FIGS. 4 and 5, the validation process of switch fabric system 300 can include sending a validation packet from the source edge device 310 through each possible path (323, 325, 327) through which the validation packet can be sent within the switch fabric system 300 to reach the destination edge device 318.

Figures 4, 5:
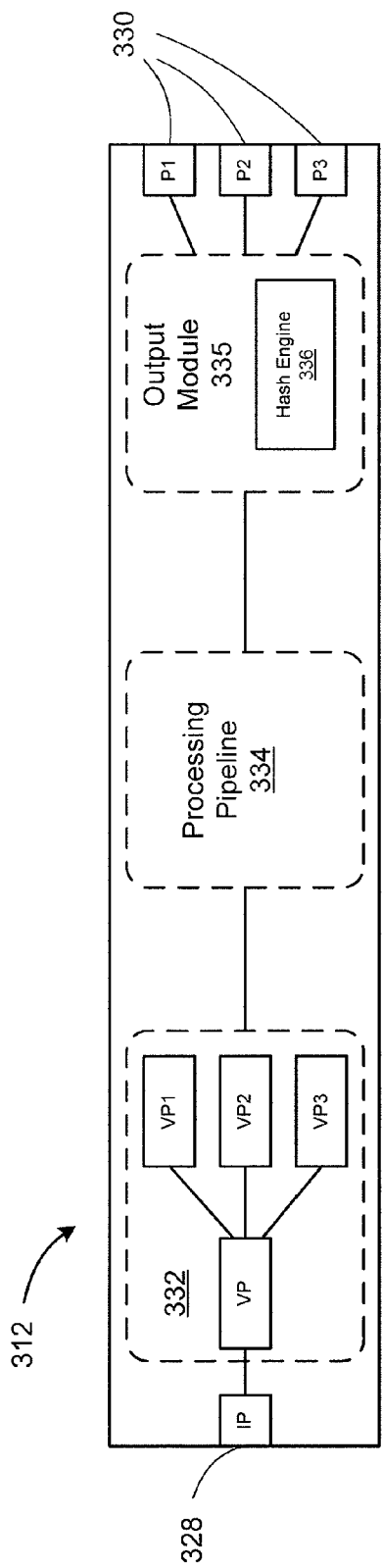
FIG. 4 is a schematic illustration of a first stage module of the switch fabric of FIG. 3.
FIG. 5 is a reverse hash lookup table associated with the first stage module of FIG. 4.

FIG. 4 illustrates the first stage module 312 within the switch fabric 302. The first stage module 312 includes an input port 328, multiple output ports 330 (having port numbers P1, P2, P3), a replication engine 332, a processing pipeline 334 and an output module 335 that includes a hash engine 336. The input port 328 can be any port suitable to receive data packets from edge device 310 (or other edge devices). The output ports 330 can each be any port suitable to send data packets to a module of the second stage of the switch fabric 302. Accordingly, in this example, the output ports 330 can operatively couple the first stage module 312 with the second stage modules 314, 314', 314".

As described above, the first stage module 312 can receive a data packet from the edge device 310. For the validation process to be active, the data packet is a validation packet VP. The validation packet VP can be configured the same as described herein for other data packets. The validation packet VP can be, for example, an Ethernet data packet, and include a header (also referred to as "header portion"), a source ID, a destination ID, etc. The validation packet VP can be used to test or validate the switch fabric system 300 to identify any failures within any possible path through the switch fabric system 300 that the validation packet VP can be sent from source edge device 310 to destination edge device 318.

Specifically, when the validation packet VP is received at first stage module 312, the replication engine 332 can use the following information to determine how many output ports 330 are available through which the validation packet VP can be sent to reach the edge device 318: (1) an identifier included in a validation packet that recognizes a target destination edge device, (2) a datapath-configured look-up table that maps the identifier included in a validation packet to a specific LAG that allows reachability to the destination edge device, and (3) a membership count of the specific LAG (the number of paths or members within a LAG tracked, e.g., the replication engine 332). The datapath-configured look-up table can be defined, for example, by an entity (e.g., a network administrator) that is responsible for setting up the forwarding paths in the switch fabric.

In this embodiment, three possible output ports 330 (P1, P2, P3) exist. Because each second stage module 314, 314', 314" is connected to the third stage module 316, the validation packet VP can be sent through each of the possible output ports 330 (P1, P2, P3) and reach the third stage module 316 and then destination edge device 318 The replication engine 332 can define a set of validation packets based on the number of output ports 330. Specifically, the replication engine 332 can define a replicate or copy of the validation packet VP for each possible output port 330 that the validation packet VP can be sent to reach the edge device 318. As shown in FIG. 4, the replication engine 332 can define a validation packet VP1, a validation packet VP2, and a validation packet VP3. The replication engine 332 can also append a new header (also referred to as header portion) to each of the validation packets VP1, VP2, VP3. For example, the replication engine 332 can append a header to each of the validation packets VP1, VP2, VP3 that encapsulates the other headers (e.g., a header replicated from the original validation packet VP that can include, e.g., an Ethernet header and/or a meta-header) included within each validation packet VP1, VP2, VP3. In some embodiments, the appended header can replace, rather than encapsulate, a header(s) on the incoming validation packet. The appended header can include a unique header value associated with each possible port 330 to which the validation packers VP 1, VP2, VP3 can be sent.

To determine the unique header value for each validation packet VP1, VP2, VP3, the replication engine 332 can use a reverse hash lookup table 340, shown in FIG. 5. As shown in FIG. 5, the reverse hash lookup table 340 defines header values H1, H2, H3, associated with output port numbers P1, P2, P3, respectively. In this example, the header values H1, H2, H3 have a direct association to the output ports P1, P2, P3, respectively. In some embodiments, the header value H1, H2, H3 can have an indirect association to the output ports P1, P2, P3. For example, the header values H1, H2, H3, can be associated to a unique hash index value (not shown) that may be an index to a table of LAG members. In such an embodiment, the header values H1, H2, H3 can be indirectly associated with a LAG member output port.

In the example shown in FIGS. 4 and 5, the replication engine 332 can assign or append a header value H1 to validation packet VP1, a header value H2 to validation packet VP2, and a header value H3 to validation packet VP3. The assigned header values H1, H2 and H3 ensure that the validation packets VP1, VP2, VP3 will be sent to the second stage modules 314, 314', 314", respectively, via the three possible output ports P1, P2, P3, respectively. For example, the assigned header values H1, H2 and H3 can be hashed to a unique hash indices each of which maps to a different output port P1, P2, P3; this allows the validation packets VP1, VP2, VP3 to be sent to the second stage modules 314, 314', 314" via output ports P1, P2, P3 based on a hash of the header values H1, H2 and H3. The header values H1, H2 and H3 are used by the hash engine 336 as an input to a hash function that results in an output of an identifier of a specific output port 330 to which a data packet is to be sent. Thus, the reverse hash lookup table 340 defines a header value (H1, H2, H3) to be included in the appended header of each of the validation packets VP1, VP2, VP3 to result in a hash function output corresponding to each of the three possible output ports P1, P2, P3, respectively. In other words, by assigning this header value (H1, H2, H3) to each of the validation packets VP1, VP2, VP3 based on the reverse hash lookup table 340, the particular output port 330 to which each of the validation packets VP1, VP2, VP3 is to be forwarded can be pre-determined to be the output ports P1, P2, P3, respectively.

After appending the headers (with header values H1, H2, H3, respectively) to the validation packets VP1, VP2, VP3, the validation packets VP1, VP2, VP3 can be sent to the processing pipeline 334 for any further processing of the validation packets that may be performed. For example, the processing pipeline 334 can perform processing functions, such as, classification and flow control. The processing pipeline 334 can be any suitable processor configured to receive and/or read data packets, including validation packets VP1, VP2 and VP3, from the replication engine 332, and process the data packets, and send and/or store the data packets to the output module 335. The processing pipeline 334 can include a combination of hardware modules and software modules (executing in hardware). In some embodiments, for example, the processing pipeline 334 can include a field-programmable gate array (FPGA), an application specific integrated circuit (ASIC), a digital signal processor (DSP) and/or the like.

As described above, the hash engine 336 can use header information (e.g., source ID, destination ID), and other parameters as input to a hash function to determine which output port 330 to send a data packet, such that the data packet will be sent to and received at the indicated destination edge device. For example, the hash engine 336 can use as input to the hash function parameters from nested headers (e.g., from Ethernet header and/or meta-header used by the modules to control forwarding of the validation packet), datapath state information, such as, for example, the input port through which the validation packet was received at that module. Thus, when a validation packet (e.g., VP1, VP2, VP3) is received at the hash engine 336, the hash engine 336 can use the header value (e.g., H1, H2, H3) within the appended header of that validation packet as the input to the hash function to determine which output port 330 (e.g., P1, P2, P3) to send the validation packet. For example, when validation packet VP1 is received at the hash engine 336, the hash engine 336 can use the appended header value H1 as input to the hash function, which will result in an output from the hash function of output port number P1 (or an identifier for output port number P1). The output module 335 can then forward the validation packet VP1 to output port number P1 to be sent to second stage module 314. The hash engine 336 can perform the same process for validation packet VP2 and validation packet VP3.

Thus, each of the validation packets VP1, VP2, VP3 will be sent to a different possible output port 330 (e.g., output port numbers P1, P2, P3, respectively) of first stage module 312 and sent to the corresponding second stage module 314, 314', 314" that is coupled to that output port 330. By defining multiple validation packets (VP1, VP2, VP3) from a single validation packet VP, a validation packet can be sent through each possible path out of the first stage module 312 that the validation packet VP can be sent to reach destination edge device 318. At each of the second stage modules 314, 314', 314", a similar process can be performed on each of the validation packets VP1, VP2, VP3, respectively.

Figures 6, 7:
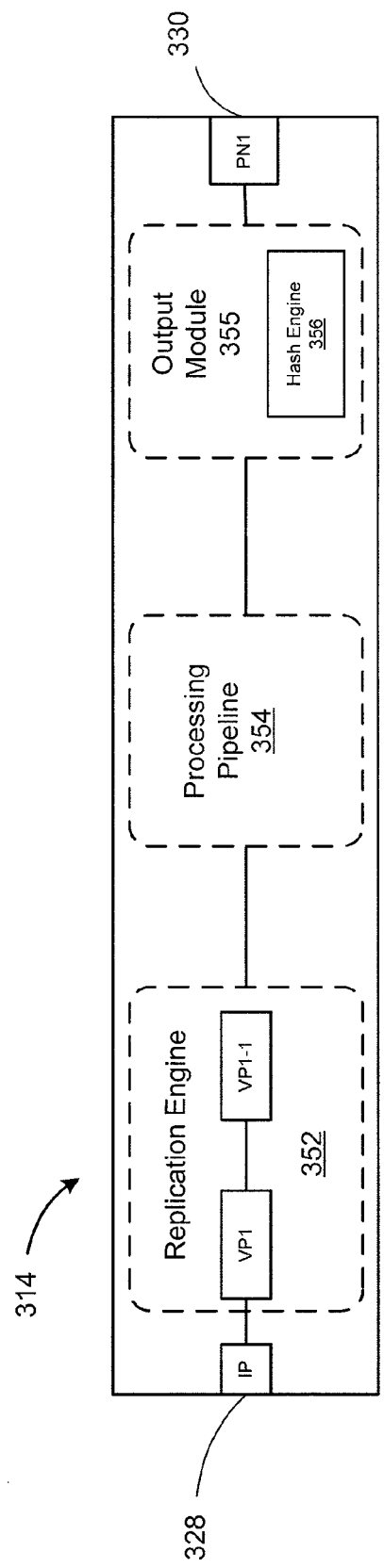
FIG. 6 is a schematic illustration of a second stage module of the switch fabric of FIG. 3.
FIG. 7 is a reverse hash lookup table associated with the second stage module of FIG. 6.

For example, as shown in FIG. 6, the second stage module 314 includes an input port 328, a replication engine 352, a processing pipeline 354, an output module 355 that includes a hash engine 356 and an output port 330. When the validation packet VP1 is received at second stage module 314, the replication engine 352 can determine how many possible output ports 330 of second stage module 314 through which the validation packet VP1 can be sent to reach the edge device 318. In this embodiment, the second stage module 314 includes only one possible output port 330 (e.g., output port number PN1) that the validation packet VP1 can be sent and reach the destination edge device 318. Thus, the replication engine 352 can define a single validation packet VP1-1. In this example, FIG. 6 illustrates an embodiment of the second stage module 314 with a single possible output port 330 coupled to the third stage module 316. As previously described, in alternative embodiments, second stage module 314 can include a second output port (not shown) coupled to a second third stage module (not shown) that is not coupled to the edge device 318. In such an embodiment, the possible output port(s) to send a validation packet would still be only output port PN1 coupled to third stage module 316. In another alternative embodiment, the second stage module 314 can include output port PN1 and a second output port (not shown), each coupled to the third stage module 316. In such an embodiment, the number of possible output ports 330 to send a validation packet would be two (including output port PN1), because both output ports are connected to the third stage module 316. An example of such an embodiment is described below with reference to FIG. 8.

The replication engine 352 can also append a header including a header value to the validation packet VP1-1 and encapsulating the other header information (including the header (with header value H1) appended to the validation packet VP1 in the first stage module 312, and the header included in original validation packet VP) in a similar manner as described above for first stage module 312. For example, as shown in FIG. 7, the replication engine 352 can use a reverse hash lookup table 360 to determine a header value HV1 to include in the appended header of validation packet VP1-1 such that the validation packet VP1-1 will be forwarded to output port number PN1. In some embodiments, the replication engine 332 can append the new header to the validation packet VP1 and also remove or discard the header with header value H1 that was appended to the validation packet VP1 in the first stage module 312. In other words, the validation packet VP1-1 can include the new header with header value HV1 that encapsulates the original header information of validation packet VP, but no longer includes the header with header value H1 that was appended at the first stage module 312.

The validation packet VP1-1 can then be sent to the processing pipeline 354 for further processing if needed, and then to the output module 355. At the output module 355, the hash engine 356 can then use the header value HV1 as input to a hash function, which will result in an output from the hash function of output port number PN1. Thus, the validation packet VP1-1 can be forwarded by the hash engine 356 to the third stage module 316 via the output port number PN1. The second stage modules 314' and 314" can each be configured structurally the same and perform the same processing to validation packets VP1 and VP2, respectively, as second stage module 314. For example, the second stage module 314' can send a validation packet VP2-1 (not shown) with an appended header including a header value HV2 (not shown) to the third stage module 316, and the second stage module 314" can send a validation packet VP3-1 (not shown) with an appended header including a header value HV3 (not shown) to the third stage module 316. Thus, the third stage module 316 can receive the validation packets, VP1-1, VP2-1, VP3-1 from the three second stage modules 314, 314', 314", respectively.

In some embodiments, each of the second stage modules 314, 314', 314" can verify to the first stage module 312 when a validation packet (e.g., VP1, VP2, VP3) has been received at the second stage module 314, 314', 314". For example, a handshake between the first stage module 312 and each second stage module 314, 314', 314" can be used to verify receipt of the validation packets VP1, VP2, VP3, respectively. Similarly, the third stage module 316 can verify receipt of the validation packets VP1-1, VP2-1, VP3-1 from the second stage modules 314, 314', 314", respectively. This communication between modules of different stages can be included between each stage of the switch fabric 302.

In this embodiment, the switch fabric 302 is a three-stage switch fabric and the third stage module 316 is coupled to a single edge device 318. In some such embodiments, the third stage module 316 can consolidate the three validation packets VP1-1, VP2-1, VP3-1 into a single validation packet VP to be sent to the edge device 318. For example, the third stage module 316 can remove the appended headers with header values HV1, HV2, HV3 from each of the validation packets VP1-1, VP2-1, VP3-1, respectively. The third stage module 316 can also remove the headers with header values H1, H2, H3 from the encapsulated layer of the validation packets associated with the validation packets VP1, VP2, VP3, respectively defined at the first stage module 312. Thus, the resulting validation packets VP1-1, VP2-1, VP3-1 will have the same header information as original validation packet VP. The third stage module 316 can discard two of the validation packets VP1-1, VP2-1, VP3-1 (e.g., VP2-1 and VP3-1) and send the remaining validation packet (e.g., VP1-1) to the edge device 318. In some embodiments, the third stage module 316 can first discard two of the validation packets, and then remove the headers that were added by the first stage module and the second stage modules.

In some such embodiments, the third stage module 316 can send all three validation packets VPI-1, VP2-1, VP3-1 to the edge device 318. The edge device 318 can then consolidate the validation packets VP1-1, VP2-1, VP3-1 into a single validation packet VP in a similar manner as described above for third stage module 316. In some embodiments, instead of or in addition to, consolidating the three validation packets, the edge device 318 can use the three validation packets to identify each of the different paths through which the validation packet VP was sent between the edge device 310 and the edge device 318. For example, the edge device 318 can identify the different paths the validation packets have been sent based on the various layers of headers that have been appended to each of the validation packets.

In some embodiments, the third stage module 316 can define an entirely new validation packet to forward to the destination edge device 318 and discard the three validation packets VP1-1, VP2-1, VP3-1. In such an embodiment, the new validation packet can include a new header distinct from any of the previous validation packets (VP1-1, VP2-1, VP3-1).

In some embodiments, the third stage module 316 can include multiple output ports and links (e.g., a LAG) to the edge device 318. In such an embodiment, a replication module (not shown) of the third stage module 316 can define a validation packet associated with each possible output port that a data packet can be sent to reach the edge device 318 in a similar manner as described above for first stage module 312 and second stage module 314.

While switch fabric 302 shown and described above is a three-stage switch fabric, in other embodiments of a switch fabric system a switch fabric can include any number of stages. In some embodiments, for example, the switch fabric can be a five stage switch fabric similar to the switch fabric shown and described in co-pending U.S. patent application Ser. No. 12/345,500, filed on Dec. 29, 2008, and entitled System Architecture for a Scalable and Distributed Multi-Stage Switch Fabric," and co-pending U.S. patent application Ser. No. 12/345,502, filed on Dec. 29, 2008, and entitled "Methods and Apparatus Related to a Modular Switch Architecture," each of which is incorporated herein by reference in its entirety.

Thus, the validation process described herein can be used in a switch fabric system having any number of modules and any number of stages. For example, in other embodiments, such as, for example, a five stage switch fabric, more than one third stage module can exist, and therefore, the possibility of multiple different paths from the third stage module to a fourth stage module(s) and multiple different paths from the fourth stage module(s) to the fifth stage module. In such an embodiment, the third stage module can define validation packets associated with each of the possible output ports in the same manner as described above for the first stage module and the second stage module.

The validation process can be used to generate validation packets in the same manner at each module/stage of the switch fabric system regardless of the number of ECMP paths or members. For example, the same validation process can be used at each stage of a switch fabric system where one stage (e.g., a first stage module) may have one or more ECMP members, while a second stage and a third stage may each have only one member.

Figure 8:
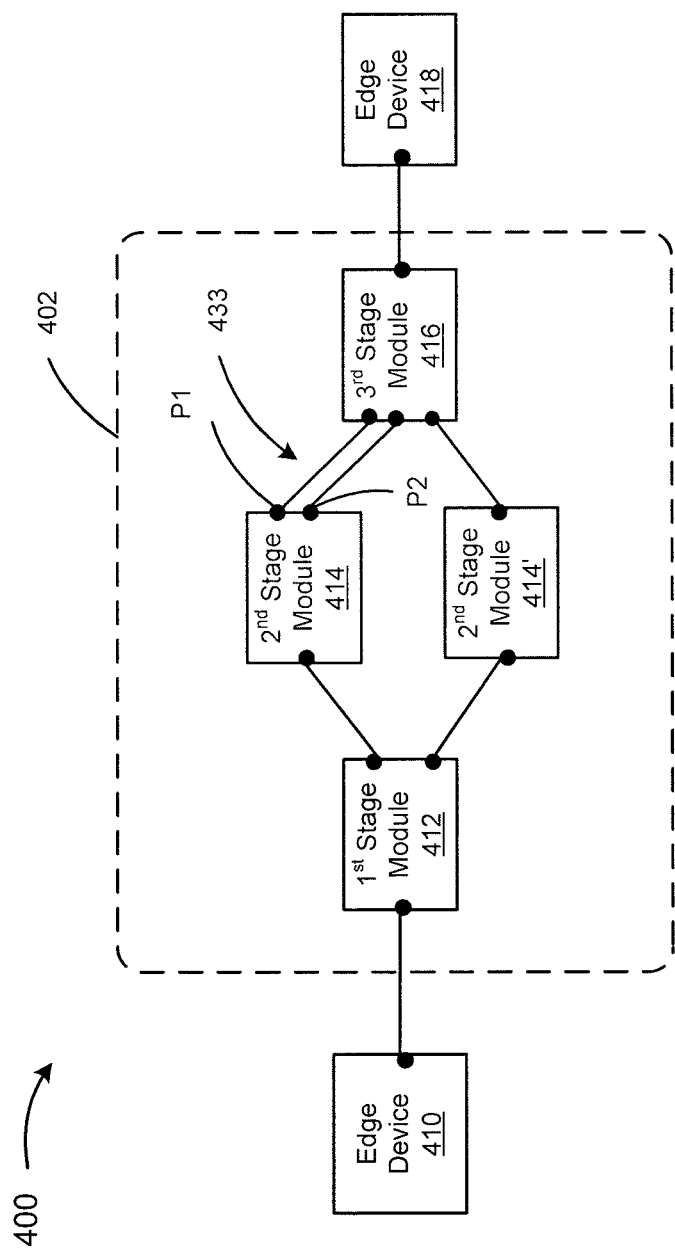
FIG. 8 is a schematic illustration of a switch fabric system, according to another embodiment.

Additionally, the validation process described herein can be used for a single link between a module of one stage and a module of another stage of a switch fabric, as described for switch fabric system 300, or can be used to verify a LAG between a module of one stage and a module of another stage of a switch fabric. For example, in an alternative embodiment, as shown in FIG. 8, a switch fabric system 400 can include a source edge device 410, a destination edge device 418, and a switch fabric 402. The switch fabric 402 includes a first stage module 412, two second stage modules 414 and 414', and a third stage module 416, each configured structurally and functionally similar to the first stage module, second stage modules and third stage module of switch fabric 302. The edge device 410 and the edge device 418 can each be configured structurally and functionally similar to other edge devices described herein. A validation mechanism as described above can be used to verify the transmission of a validation packet from the edge device 410 to the edge device 418.

In this embodiment, the second stage module 414 includes two possible output ports with output port numbers P1 and P2, coupled to the third stage module 416, through which a data packet can be sent from source edge device 410 to reach destination edge device 418. The links 433 between the second stage module 414 and the third stage module 416 form a LAG, with each link 433 being a part of a possible path to the edge device 418. In such an embodiment, when the second stage module 414 receives, for example, a validation packet VP1 (not shown in FIG. 8), sent from the first stage module 412 as described above for switch fabric system 300, a replication engine (not shown in FIG. 8) of the second stage module 414 can define two validation packets VP2-1 and VP2-2 (not shown in FIG. 8), with new appended headers having header values HV1 and HV2 (not shown in FIG. 8), respectively, determined from a reverse hash lookup table (not shown in FIG. 8) in a similar manner as described above for switch fabric system 300. The header value HV1 can be associated with the output port number P1 and the header value HV2 can be associated with the output port number P2. A hash engine (not shown in FIG. 8) can use the header values HV1 and HV2 as input to a hash function with resulting hash function outputs of output port numbers P1 and P2, respectively, in a similar manner as described above for switch fabric system 300. Thus, the individual links of a LAG can each receive and be subject to a validation packet.

In some embodiments, a switch fabric can include, for example, a second stage module that has multiple input ports each configured to receive data packets from multiple different first stage modules, and multiple output ports each linked to a different third stage module. Such an embodiment is similar to, for example, the switch fabric 200 described above. In some such embodiments, the second stage module can receive three validation packets each defined by a replication engine of one of the first stage modules. If, for example, the second stage module has a single output port linking the second stage module to a third stage module, the second stage module can consolidate the validation packets into a single validation packet as described above with reference to third stage module 316. If, for example, the second stage module has two output ports linking the second stage module to one or two third stage modules, the second stage module can consolidate the three validation packets into two validation packets, with each associated with one of the two output ports. In another example, if the second stage module has four output ports linking the second stage module to one or more third stage modules, the second stage module can define four validation packets in a similar manner as described above. Thus, a validation packet can be defined at each module within each stage of a switch fabric, for each possible output port of that module that the validation packet can be sent and reach the destination edge device.

In some embodiments, an edge device (e.g., source edge device 310) can be part of a LAG(s) (or ECMP path(s)) between the edge device and a module(s) of the switch fabric(es). For example, a source edge device can have multiple output ports coupled to a first stage module of a switch fabric. In another example, the source edge device can have one more output ports coupled to one or more first stage modules of a first switch fabric and the source edge device can have one or more output ports coupled to one or more first stage modules of a second switch fabric. The source edge device can be configured structurally and functionally the same as, or similar to, the modules of the switch fabric described above. For example, the source edge device can include a replication engine, a processing pipeline and a hash engine. In one example, the source edge device can include three output ports, each coupled to a different first stage module of the switch fabric. As described above, the source edge device can receive a validation packet and can define three validation packets based on the received validation packet, each to be sent to a different output port.

Figure 9:
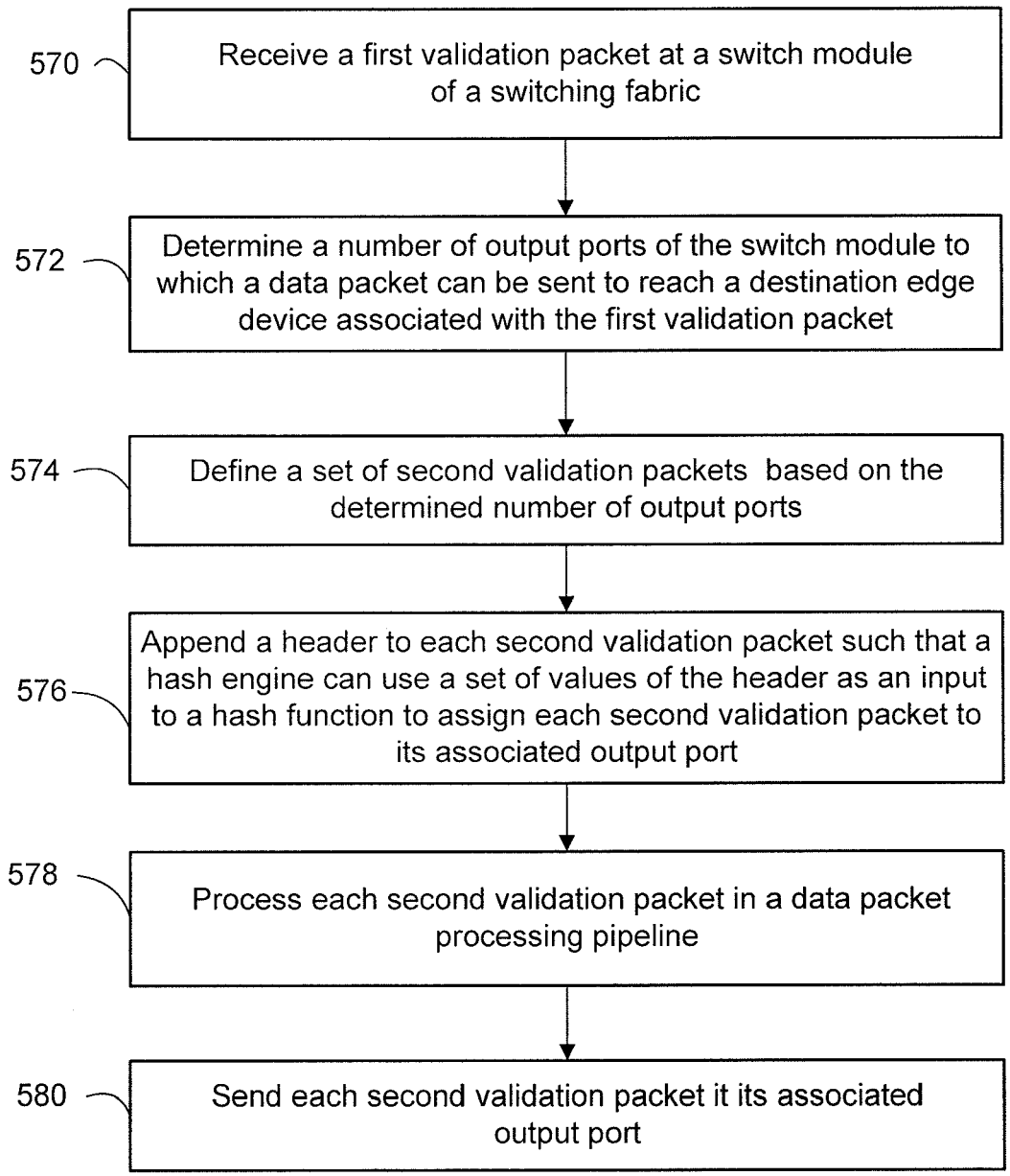
FIG. 9 is a flow chart illustrating a method of validating ECMP paths within a switch fabric system, according to an embodiment.

FIG. 9 is a flowchart illustrating a method of defining a set of validation packets at a module of a switch fabric within a switch fabric system that uses ECMP multipath. At 570, a first validation packet can be received at a switch module (e.g., a first stage module, a second stage module, etc.) of a distributed switch (e.g., a switch fabric). As described herein, in some embodiments, the switch module can be, for example, a first stage switch module in a switch fabric that is operatively coupled to multiple second stage switch modules of the switch fabric via multiple output ports of the first stage switch module. At 572, a number of output ports of the switch module to which a data packet can be sent to reach a destination edge device associated with the first validation packet can be determined. For example, the number of output ports of the switch module to which the data packet can be sent can be determined based on a destination identifier of the first validation packet.

At 574, a set of second validation packets can be defined based on the determined number of output ports. As described herein, each second validation packet can be uniquely associated directly or indirectly (e.g., via a separate look-up table) with an output port of the switch module to which the first validation packet can be sent. Thus, the set of second validation packets can include a number of second validation packets equal to the number of output ports of the switch module to which the data packet can be sent to reach the destination edge device associated with the first validation packet. Also described herein, each second validation packet can be configured to verify a different data path through the distributed switch between a source edge device and the destination edge device. At 576, a header can be appended to each second validation packet such that a hash engine can use a set of values of the header (and/or nested header(s)) of each second validation packet as an input to a hash function to assign each second validation packet to its associated output port. As described above, in some embodiments, the header appended to the second validation packet can replace rather than encapsulate, a header(s) on the incoming first validation packet. At 578, each second validation packet can be processed in a data packet processing pipeline prior to sending each second validation packet to its associated output port, and at 580, each second validation packet can be sent to its associated output port.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described. In addition, the embodiments described herein can include various other features and functions not specifically illustrated and described with reference to specific embodiments.

For example, in some embodiments, a data packet (e.g., a validation packet) can also include a virtual local area network (VLAN) identifier in a header of the data packet. In some embodiments of a validation mechanism as described herein, such a VLAN identifier can contribute to the determination as to the paths of the switch fabric system that the validation packet can be routed. For example, in some embodiments, the hash function used at the hash engine of a switch module can be coded such that the validation packet is not sent through one or more possible output ports of the switch module (e.g., those ports associated with a different VLAN).

In some embodiments, a validation packet can include header information to ensure the validation packet gets sent to all egress queues of a switch module. For example, a switch module described herein can have one or more egress queues associated with the output ports of the switch module. An egress queue can make sure that a data packet is sent to the proper output port for that data packet. For example, a switch module may have a first output port for sending high priority data packets and a second output port for sending low priority data packets. In some embodiments of a validation mechanism as described herein, an egress queue identifier can contribute to the determination as to the paths of the switch fabric system that a validation packet can be sent. For example, in addition to determining which output port a validation packet can be sent, a header value of the validation packet can indicate which egress queue(s) the validation packet can be sent.

In some embodiments, a switch module can include multiple lookup tables. For example, different hash lookup tables can be defined for different types of data packets (e.g., known unicast, unknown unicast, known multicast, unknown multicast). The different types of data packets can have different paths through the switch fabric system between a source edge device and a destination edge device. Thus, for example, a first hash lookup table can be used for a unicast validation packet, and a second hash lookup table can be used for a multicast validation packet. Each lookup table can define different header values to append to the validation packet based on the type of validation packet. A hash lookup table can also be defined for other types of data packets including IP data packets and/or Fiber Channel over Ethernet (FCOE) data packets.

In addition, depending on the type of validation packet, the validation packet can be routed to a different output port of the switch module. For example, in the switch fabric system of FIG. 3, a multicast validation packet may be designated to be routed through only path 323 and a unicast validation packet may be routed to go through only path 325. Depending on the type of validation packet, the validation packet can also be routed to a different part of the processing pipeline of the switch module. For example, the header value of a unicast validation packet may route the validation packet to a different part of the processing pipeline than for a multicast validation packet. In some embodiments, a first type of validation packet (e.g., unicast) and a second type of validation packet (e.g., multicast) can be routed to different parts of the processing pipeline, and be sent to the same output port of a switch module.

In some embodiments, a data packet (e.g., a validation packet) can include other different types of headers, such as, for example, a Logical Link Control (LLC) header and/or a Sub Network Access Protocol (SNAP) header. SNAP headers can be specific type values associated with a specific organization or can be generic. Such LLC and/or SNAP headers can also be used in a validation process described herein to indicate different processing that may be done to the validation packet and/or different routing of the validation packet through the switch fabric system.

In some embodiments, a validation process as described herein can be used on a periodic basis to monitor and verify the OAM operations. In such an embodiment, the destination edge device can be configured to know when to expect a validation packet(s) based on a periodic schedule. If the destination edge device does not receive a validation packet(s) as scheduled, the destination edge device will know that a failure exists within all the possible paths from the source edge device to the destination edge device.

In some embodiments, a validation process as described herein can be used as a diagnostic tool initiated to perform a one-time verification test. For example, in some embodiments, the validation process can be initiated to test a specific path of a data packet through a switch fabric system between a first edge device and a destination (e.g., a particular module within the switch fabric, or a particular edge device). In some embodiments, a user can provide a flow definition in a header of the validation packet to specify, for example, the path to be validated and/or other flow controls such as, for example, packet size, priority and/or payload byte pattern. In some embodiments, the switch fabric system can include a control plane, and the source edge device can send a signal to the destination edge device to indicate that a validation packet will be sent. Thus, in such an embodiment, if the destination edge device does not receive the validation packet, the destination edge device will know that a failure exists within all the possible paths from the source edge device to the destination edge device.

In some embodiments, for example, where multiple LAGs (or ECMP paths) associated with a particular stage or edge device are present, it may be desirable to validate on a periodic basis all of the LAGs (or ECMP paths) and their member ports that allow reachability to a given target edge device/destination edge device combination. In some embodiments, it may be desirable to periodically monitor or validate less than all of the LAGs (or ECMP paths). For example, a single LAG can be validated. In some embodiments, where multiple LAGs (or ECMP paths) associated with a particular stage or edge device are present, it may be desirable to perform a diagnostic validation test on only a single or specific LAG (or ECMP path) that allows reachability to a given destination device. In some embodiments, where multiple LAGs (or ECMP paths) associated with a particular stage or edge device are present, it may be desirable to perform a diagnostic validation test on all of the LAGs (or ECMP paths).

In some embodiments, the validation process described herein can be used to indicate the presence of a failure within the switch fabric system, without identifying the specific location of the failure. For example, a destination edge device may receive N number of validation packets and can compare that number to M number of validation packets that the edge device expected to receive. For example, the destination edge device can store a number corresponding to the number of paths across which a validation packet can be sent from a source edge device to be received at the destination edge device. Accordingly, the destination edge device can compare the number of validation packets that should be received with the number of validation packets actually received. If N is less than M, it can indicate that one or more of the expected validation packets did not make it to the edge device, but not identify which path the missing validation packet(s) was sent or at which module(s) in that path(s) a failure may have occurred. If N is equal to M, then no failures are identified.

In some embodiments, the validation process can identify the specific location of a failure. For example, in some embodiments, the destination edge device can be coded to know all possible paths and modules that the validation packets can be sent. Based on the header information of the validation packets received at the destination edge device, the destination edge device can identify all the paths and modules through which the validation packets have been sent. Thus, the destination edge device can determine which validation packet(s), and their corresponding path(s), did not get sent to the destination edge device.

In some embodiments, a validation packet can include a Time-To-Live (TTL) header field that can be used to prevent a validation packet from being caught in a loop and taking up resources (e.g., bandwidth) in the switch fabric system. For example, in some situations, a failure in the switch fabric system can cause a data packet to continually loop through a portion of the switch fabric system. A validation packet can include a TTL header with an initial TTL value of N that is greater than the number of physical hops M in the switch fabric system between the source edge device and the destination edge device. For example, in the switch fabric system 300 illustrated in FIG. 3, the switch fabric system 300 includes 4 physical hops (a first hop from the source edge device to the first stage module, a second hop from the first stage module to the second stage modules, a third hop from the second stage modules to the third stage module, and a fourth hop from the third stage module to the destination edge device). In such an embodiment, the TTL value N will initially be greater than 4.

As the validation packet is sent between modules of the switch fabric system, the TTL value can be decremented at each physical hop. Thus, if the validation packet is sent through the switch fabric system and reaches the destination edge device, the TTL value should be greater than zero. If the validation packet gets caught in a loop, for example looping back through a module, each time the validation packet is sent back to that same module, the TTL value will be decremented until the TTL value is equal to zero. Each module in the switch fabric system can check the TTL field to determine the TTL value for that validation packet. When the TTL value is equal to zero, the module will discard and/or drop the validation packet. Thus, that validation packet will not reach the destination edge device. In such a situation, the destination edge device can determine that the correct number of validation packets were not received and that a failure in the switch fabric system has occurred as previously described.

In some embodiments, a validation packet can include a Type-Link-Value (TLV) header field. The TLV field can maintain a log of the path the validation packet is taking through the switch fabric system. At each module of the switch fabric system, the TLV header can append an identifier of the module to the validation packet. In some embodiments, the TLV header can append an identifier associated with an output port of the module to which the validation packet is sent. For example, in a LAG, as shown in FIG. 8, the TLV header can append an identifier for the particular output port that the validation packet is sent. The TLV information can be used, for example, at the destination edge device to determine the specific path a validation packet as passed through in the switch fabric system.

Embodiments shown and described above refer to multiple peripheral processing devices, including compute notes, storage nodes, service nodes and routers. In some embodiments, one or more of the compute nodes can be general-purpose computational engines that can include, for example, processors, memory, and/or one or more network interface devices (e.g., a network interface card (NIC)). In some embodiments, the processors within a compute node can be part of one or more cache coherent domains. In some embodiments, the compute nodes can be host devices, servers, and/or so forth. In some embodiments, one or more of the compute nodes can have virtualized resources such that any compute node (or a portion thereof) can be substituted for any other compute node (or a portion thereof) operatively coupled to a switch fabric system.

In some embodiments, one or more of the storage nodes can be devices that include, for example, processors, memory, locally-attached disk storage, and/or one or more network interface devices. In some embodiments, the storage nodes can have specialized modules (e.g., hardware modules and/or software modules) to enable, for example, one or more of the compute nodes to read data from and/or write data to one or more of the storage nodes via a switch fabric. In some embodiments, one or more of the storage nodes can have virtualized resources so that any storage node (or a portion thereof) can be substituted for any other storage node (or a portion thereof) operatively coupled to a switch fabric system.

In some embodiments, one or more of the services nodes can be an open systems interconnection (OSI) layer-4 through layer-7 device that can include, for example, processors (e.g., network processors), memory, and/or one or more network interface devices (e.g., 10 Gb Ethernet devices). In some embodiments, the services nodes can include hardware and/or software (executing on hardware) to perform computations on relatively heavy network workloads. In some embodiments, the services nodes can perform computations on a per-packet basis in a relatively efficient fashion (e.g., more efficiently than can be performed at, for example, a compute node). The computations can include, for example, stateful firewall computations, intrusion detection and prevention (IDP) computations, extensible markup language (XML) acceleration computations, transmission control protocol (TCP) termination computations, and/or application-level load-balancing computations. In some embodiments, one or more of the services nodes can have virtualized resources so that any service node (or a portion thereof) can be substituted for any other service node (or a portion thereof) operatively coupled to a switch fabric system.

In some embodiments, one or more of the routers can be networking devices operable to connect at least a portion of a switch fabric system (e.g., a data center) to another network (e.g., the global Internet). In some embodiments, for example, a router can enable communication between components (e.g., peripheral processing devices, portions of the switch fabric) associated with a switch fabric system. The communication can be defined based on, for example, a layer-3 routing protocol. In some embodiments, one or more of the routers can have one or more network interface devices (e.g., 10 Gb Ethernet devices) through which the routers can send signals to and/or receive signals from, for example, a switch fabric and/or other peripheral processing devices.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

What is claimed is:

1. An apparatus, comprising:
   a replication engine of a switch module of a multi-stage switch, the replication engine configured to receive a first validation packet from an input port of the switch module, the replication engine configured to determine a plurality of output ports of the switch module to which a data packet can be sent to reach a destination device associated with the first validation packet,
   the replication engine configured to define a plurality of second validation packets based on a number of output ports from the plurality of output ports such that each second validation packet from the plurality of second validation packets is uniquely associated with an output port from the plurality of output ports, the replication engine configured to send the plurality of second validation packets to an output module configured to forward each second validation packet from the plurality of second validation packets to its associated output port.

2. The apparatus of claim 1, wherein the replication engine is configured to send the plurality of second validation packets to the output module such that the output module can use a header portion of each second validation packet from the plurality of second validation packets as an input to a hash function to determine to which output port from the plurality of output ports to forward each second validation packet from the plurality of validation packets.

3. The apparatus of claim 1, wherein each second validation packet from the plurality of second validation packets is configured to verify a different data path through the multi-stage switch between a source device and the destination device.

4. The apparatus of claim 1, wherein the replication engine is configured to query a reverse hash lookup table to determine a unique header to append to each second validation packet from the plurality of second validation packets.

5. The apparatus of claim 1, wherein the replication engine is configured to send the plurality of second validation packets to the output module via a processing module.

6. The apparatus of claim 1, wherein the multi-stage switch is a Clos network.

7. A non-transitory processor-readable medium storing code representing instructions to cause a processor to:
   receive a first validation packet at a switch module of a distributed switch;
   determine a number of output ports from a plurality of output ports of the switch module to which a data packet can be sent to reach a destination edge device associated with the first validation packet;
   define a set of second validation packets based on the number of output ports from the plurality of output ports, each second validation packet from the set of second validation packets is uniquely associated with an output port from the plurality of output ports of the switch module to which the first validation packet can be sent; and
   send each second validation packet from the set of second validation packets to its associated output port.

8. The non-transitory processor-readable medium of claim 7, wherein each second validation packet from the set of second validation packets is configured to verify a different data path through the distributed switch between a source edge device and the destination edge device.

9. The non-transitory processor-readable medium of claim 7, wherein the code representing instructions to cause the processor to determine includes code representing instructions to cause the processor to determine the number of output ports of the switch module to which the data packet can be sent based on a destination identifier of the first validation packet.

10. The non-transitory processor-readable medium of claim 7, further comprising code representing instructions to cause the processor to:

append a header to each second validation packet from the set of second validation packets such that a replication engine uses a set of values of the header of each second validation packet from the set of second validation packets as an input to a hash function to assign each second validation packet from the set of second validation packets to its associated output port.

11. The non-transitory processor-readable medium of claim 7, wherein the switch module is a first switch module, the first switch module being operatively coupled to a plurality of second switch modules via the plurality of output ports.

12. The non-transitory processor-readable medium of claim 7, wherein the set of second validation packets includes a number of second validation packets equal to the number of output ports from the plurality of output ports to which the data packet can be sent to reach the destination edge device associated with the first validation packet.

13. The non-transitory processor-readable medium of claim 7, further comprising code representing instructions to cause the processor to:

process each second validation packet from the set of second validation packets in a data packet processing pipeline prior to executing the code representing instructions to cause the processor to send each second validation packet from the set of second validation packets to its associated output port.

14. An apparatus, comprising:

a hash engine of a switch module of a multi-stage switch, the hash engine configured to receive a plurality of validation packets defined based on the switch module receiving a single validation packet at an input port, the hash engine configured to forward each validation packet from the plurality of validation packets to a different output port from a plurality of output ports based on an output of a hash function, a header portion of each validation packet from the plurality of validation packets being an input to the hash function, the header portion of each validation packet from the plurality of validation packets being defined from a reverse hash table lookup having an association between (1) a hash function input that results in a hash function output of an identifier of an output port from the plurality of output ports and (2) the identifier of that output port from the plurality of output ports.

15. The apparatus of claim 14, wherein a number of validation packets from the plurality of validation packets is equal to a number of output ports from the plurality of output ports.

16. The apparatus of claim 14, wherein the header portion of each validation packet from the plurality of validation packets is an internet protocol (IP) 5-tuple.

17. The apparatus of claim 14, wherein the switch module is part of a first stage of the multi-stage switch, each output port from the plurality of output ports being operatively coupled to a switch module of a second stage of the multi-stage switch.

18. The apparatus of claim 14, wherein the multi-stage switch is a Clos network.

19. The apparatus of claim 14, wherein each validation packet from the plurality of validation packets is configured to verify a different data path through the multi-stage switch between a source edge device and a destination edge device.

20. The apparatus of claim 14, wherein a value of the header portion of each validation packet from the plurality of validation packets is different from a value of the header portion of each remaining validation packet from the plurality of validation packets.

* * * * *